(12) United States Patent
Chen et al.

(10) Patent No.: US 8,446,910 B2
(45) Date of Patent: May 21, 2013

(54) METHODS FOR EVEN HASH DISTRIBUTION FOR PORT CHANNEL WITH A LARGE NUMBER OF PORTS

(75) Inventors: Qinyu Chen, Fremont, CA (US); Malik Maiga, Champigny sur Marne (FR)

(73) Assignee: Cisco Technology, Inc., San Jose, CA (US)

( * ) Notice: Subject to any disclaimer, the term of this patent is extended or adjusted under 35 U.S.C. 154(b) by 253 days.

(21) Appl. No.: 13/086,911

(22) Filed: Apr. 14, 2011

(65) Prior Publication Data

US 2012/0263048 A1      Oct. 18, 2012

(51) Int. Cl.
*H04L 12/56* (2006.01)
(52) U.S. Cl.
USPC .............. 370/395.32; 370/390; 455/453
(58) Field of Classification Search
USPC ............ 370/398, 390, 395.3, 395.31, 395.32, 370/252, 254; 455/453
See application file for complete search history.

(56) References Cited

U.S. PATENT DOCUMENTS

| | | | |
|---|---|---|---|
| 8,014,278 B1 * | 9/2011 | Subramanian et al. | 370/229 |
| 8,259,585 B1 * | 9/2012 | S P et al. | 370/237 |
| 2005/0094649 A1 * | 5/2005 | Varanasi et al. | 370/396 |
| 2008/0168067 A1 * | 7/2008 | Ruiz-Velasco et al. | 707/10 |
| 2010/0322076 A1 * | 12/2010 | Goel | 370/236 |
| 2011/0188503 A1 * | 8/2011 | Hewson | 370/392 |

* cited by examiner

*Primary Examiner* — Gary Mui
(74) *Attorney, Agent, or Firm* — Merchant & Gould

(57) ABSTRACT

Embodiments described herein achieve even traffic load-balancing among physical ports in a port channel with $2^N$ ports of a networking switch. Embodiments may derive an upper limit of hash values given all the possible number of ports within a port channel. Based on the determined upper limit of hash values, embodiments provide the steps to evenly distribute hash values among ports in a port channel when adding or deleting a port to achieve even traffic load-balancing among ports in a port channel all the time.

20 Claims, 4 Drawing Sheets

METHODS FOR EVEN HASH DISTRIBUTION FOR PORT CHANNEL WITH A LARGE NUMBER OF PORTS

TECHNICAL FIELD

The present disclosure relates generally to solving issues with hash distribution scalability while achieving even traffic load-balancing among all ports within a port channel.

BACKGROUND

A port channel of a network switch may be a logical interface that includes a certain number physical ports logically bundled together. For example, a port channel may have $2^N$ physical ports where N is a positive integer. A port channel's bandwidth may be the total bandwidth of all physical ports within the port channel. To fully leverage each physical port within a port channel, traffic load needs to be balanced among all physical ports. In prior implementations, each physical port may be assigned a set of values (aka "hash") ranging from 0 to $2^N-1$. The values may be pre-assigned to each port when adding or deleting a port within a port channel. When traffic flows arrive at a port channel, a hash algorithm may be applied to compute hash values based on hash inputs derived from a traffic flow's parameters such as source IP, destination IP, source MAC, destination MAC, etc. The flow may be directed to the corresponding physical port whose pre-assigned values are matched with the hash function output.

However, such prior systems have a number of problems when attempting to achieve even traffic load-balancing among ports in a port channel with $2^N$ ports. First, as the number of ports in a port channel can range from 1 to $2^N$, if the number of ports is not a binary number, the hash values ranging from 0 to $2^N-1$ may not be evenly distributed among ports which can cause uneven traffic load-balancing among ports. Second, when N scales, it may be difficult to know how to assign the hash values evenly given different number of ports in a port channel without scalability factors.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure. Moreover, in the drawings, like references numerals designate corresponding parts through the several figures.

DETAILED DESCRIPTION OF EXAMPLE EMBODIMENTS

Figure 1:
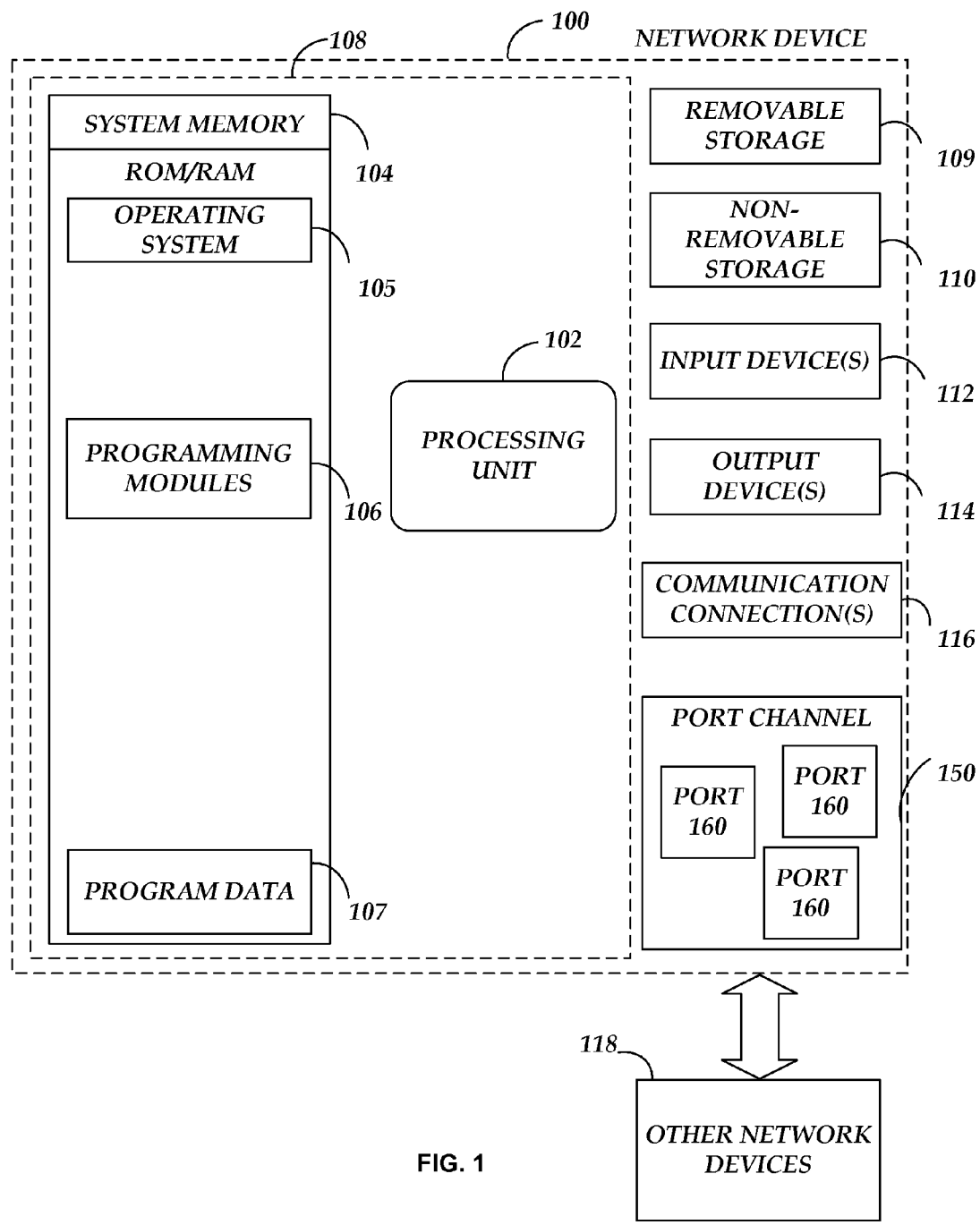
FIG. 1 is a block diagram illustrating an example environment in which certain embodiments of the present invention may be implemented.

In various embodiments, a method for hash distribution may be provided comprising initializing a global free active hash value pool and a global free standby hash value pool. The method may then determine available free active hash values from a plurality of ports currently associated with the port channel and add available free active hash values to the global free active hash value pool. Next, the method may compare a target active hash count per port with a current active hash count per port for each of the plurality of ports associated with the port channel. If the current active hash count per port for one of the plurality of ports is greater than the target active hash count per port, randomly select a number of hash values equal to the difference of the current active hash count per port for one of the plurality of ports and the target active hash count per port, and release the randomly selected hash values to the global free active hash value pool. If the current active hash count per port for one of the plurality of ports is less than the target active hash count per port, randomly select a number of hash values from the global free active hash pool equal to the difference of the current active hash count per port for the same one of the plurality of ports and the target active hash count per port, and assign the randomly selected hash values to the same one of the plurality of ports.

Consistent with embodiments of providing even traffic load balancing, a method may be provided comprising initializing a global free active hash value pool and a global free standby hash value pool. Next, the method may receive a request to delete a port in a port channel and determine one or more hash values associated with the port to be deleted. The method may assign one or more determined hash values to the global free active hash value pool and assign one or more determined hash values to the global free standby hash value pool. Next, determine available free active hash values from a plurality of ports currently associated with the port channel after deletion of the port to be deleted and compare a target active hash count per port with a current active hash count per port for each of the plurality of ports associated with the port channel. If the current active hash count per port for one of the plurality of ports is greater than the target active hash count per port, randomly select a number of hash values equal to the difference of the current active hash count per port for one of the plurality of ports and the target active hash count per port, and release the randomly selected hash values to the global free active hash value pool. If the current active hash count per port for one of the plurality of ports is less than the target active hash count per port, randomly select a number of hash values from the global free active hash pool equal to the difference of the current active hash count per port for the same one of the plurality of ports and the target active hash count per port, and assign the randomly selected hash values to the same one of the plurality of ports.

Embodiments may be described herein to achieve even traffic load-balancing among ports within a port channel with minimum traffic loss during member port change. Some embodiments may be applied to a network switch that supports a port channel with up to $2^N$ physical ports.

Some embodiments may provide a method to derive an upper limit of hash values given the number of physical ports within a port channel. The selection of the upper limit of hash values may help ensure that the hash values within the upper limit can be evenly distributed among physical ports in a port channel. Some embodiments may further provide a method to evenly distribute the hash values among physical ports with minimum hash value changes on existing ports in a port channel when adding or deleting a physical port. The distributed hash values may be limited by the upper limit of hash values derived from the first part. It then may be ensured that each physical port can be evenly load-balanced and the traffic loss can be minimized during port additions and deletions.

Embodiments of the present invention for hash distribution may be implemented in hardware, software, firmware, or a combination thereof (collectively or individually also referred to herein as logic). To the extent certain embodiments, or portions thereof, are implemented in software or firmware, executable instructions or code for performing one or more tasks of hash distribution are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent embodiments, or portions thereof, are implemented in hardware, the present invention may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

FIG. 1 is a block diagram of a system including network device 100. Consistent with embodiments of even traffic load balancing, the aforementioned memory storage and processing unit may be implemented in a network device, such as network device 100 of FIG. 1. In embodiments, network device 100 may be a network switch. Any suitable combination of hardware, software, or firmware may be used to implement the memory storage and processing unit. For example, the memory storage and processing unit may be implemented with network device 100 or any of other network devices 118, in combination with network device 100. The aforementioned system, device, and processors are examples and other systems, devices, and processors may comprise the aforementioned memory storage and processing unit, consistent with embodiments of even traffic load balancing. Furthermore, network device 100 may comprise an operating environment as described above.

With reference to FIG. 1, a system consistent with embodiments of the present invention of even traffic load balancing may include a network device, such as network device 100. In a basic configuration, network device 100 may include at least one processing unit 102 and a system memory 104. Depending on the configuration and type of network device, system memory 104 may comprise, but is not limited to, volatile (e.g., random access memory (RAM)), non-volatile (e.g., read-only memory (ROM)), flash memory, or any combination. System memory 104 may include operating system 105, one or more programming modules 106, and may include program data 107. Operating system 105, for example, may be suitable for controlling network device 100's operation. Furthermore, embodiments of even traffic load balancing may be practiced in conjunction with a graphics library, other operating systems, or any other application program and is not limited to any particular application or system. This basic configuration is illustrated in FIG. 1 by those components within a dashed line 108.

Network device 100 may have additional features or functionality. For example, network device 100 may also include additional data storage devices (removable and/or non-removable) such as, for example, magnetic disks, optical disks, or tape. Such additional storage is illustrated in FIG. 1 by a removable storage 109 and a non-removable storage 110. Computer storage media may include volatile and nonvolatile, removable and non-removable media implemented in any method or technology for storage of information, such as computer readable instructions, data structures, program modules, or other data. System memory 104, removable storage 109, and non-removable storage 110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 100. Any such computer storage media may be part of device 100. Network device 100 may also have input device(s) 112 such as a keyboard, a mouse, a pen, a sound input device, a touch input device, etc. Output device(s) 114 such as a display, speakers, a printer, etc. may also be included. The aforementioned devices are examples and others may be used.

Network device 100 may also contain a communication connection 116 that may allow network device 100 to communicate with other network devices 118, such as over a network in a distributed network environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 104, including operating system 105. While executing on processing unit 102, programming modules 106 may perform processes including, for example, one or more method 200, 300, and 400's stages as described below.

A port channel 150 of network device 100 may have up to $2^N$ physical ports (e.g., ports 160) where N is a positive integer. A hash function (hash_junc) may output a hash value in the range of 0 to $2^N-1$ where N is a positive integer. It should be noted that various hash functions may be compatible with embodiments described herein. L may represent the total number of hash values output by hash_junc where $L=2^N$. P may represent the number of physical ports bundled within port channel 150 where $1 \leq P \leq 2^N$. Within L, there may be a maximum hash value within which all the hash values can be evenly assigned to each of the P ports. The maximum hash value may serve as the upper limit of hash values denoted as M and where $0 \leq M \leq L$.

Considering an example where there is a port channel with up to 8 physical ports (i.e., N=3) bundled within it, hash_junc may output a number of (up to 8) hash values (i.e., L=8). There may be P physical ports bundled within this port channel (i.e., $1 \leq P \leq 8$). If P=1, the hash value upper limit M is 8. If P=2, the hash value upper limit M is 8. If P=3, the hash value upper limit M is 6. Using this approach, a complete table (Table 1) may be illustrated for port number P vs. upper limit of hash values M when $1 \leq P \leq 8$ and $0 \leq M \leq 8$.

TABLE 1

Port number P vs. upper limit of hash values M (N = 3)

| P | M |
|---|---|
| 1 | 8 |
| 2 | 8 |
| 3 | 6 |
| 4 | 8 |
| 5 | 5 |
| 6 | 6 |
| 7 | 7 |
| 8 | 8 |

In some embodiments, P may be denoted as the number of physical ports in port channel 150, where $1 \leq P \leq 2^N$ and N is a positive integer. P may then be represented as the following: $P=2^k*n$, where k is an integer and $k \geq 0$, n is an odd integer and $1 \leq n \leq 2^N$. For each n which is an odd integer and where $1 \leq n \leq 2^N$: Since $P=2^k*n$ and $1 \leq P \leq 2^N$, we have (1) $1 \leq 2^k*n \leq 2^N$ (k is an integer and $k \geq 0$); (2) $1/n \leq 2^k \leq 2^N/n$; (3) $\log_2(1/n) \leq k \leq \log_2(2^N/n)$. At formula stage (4) $\log_2(1/n) \leq k \leq N-\log_2 n$, where n is an odd integer and $1 \leq n \leq 2^N$. Since k is an integer, for $N-\log_2 n$, the next largest integer, may be i.e. floor($N-\log_2 n$) considering $k \geq 0$. Formula stage (4) may be represented as formula stage (5) $0 \leq k \leq \text{floor}(N-\log_2 n)$, where n is an odd integer and where $1 \leq n \leq 2^N$ and formula stage (6) $k_{max} = \text{floor}(N-\log_2 n)$, where n is an odd integer and $1 \leq n \leq 2^N$.

For each k derived at formula stage (5), formula stages (7) and (8) may be performed. Formula stage (7) may compute $P=2^k*n$. Denoting M as the upper limit of hash values corresponding to P, formula stage (8) may compute $M=2^{k_{max}}*n$. As shown in formula stage (6), $k_{max}$ is the maximum value among all derived k at formula stage (5)

In summary, given P as the number of physical ports in a port channel, where $1 \leq P \leq 2^N$ and N is a positive integer, embodiments may derive the upper limit of hash values M given the number of physical ports P as below:

---

Denote $P = 2^k * n$, where k is an integer and $k \geq 0$, n is an odd integer and $1 \leq n \leq 2^N$. For each n which is an odd integer and $1 \leq n \leq 2^N$
{
    $0 \leq k \leq \text{floor}(N-\log_2 n)$
    $k_{max} = \text{floor}(N-\log_2 n)$
    For each k which is $0 \leq k \leq \text{floor}(N-\log_2 n)$
    {
        $P = 2^k * n$
        $M = 2^{k_{max}} * n$
    }
}

---

Using the above-described method, embodiments may construct a mapping table indicating the number of physical ports (i.e., P) vs. the upper limit of hash values (i.e., M) for all cases of N>0. Tables 2-7 below illustrate resultant mapping tables for N=1, 2, 3, 4, and 5 respectively.

TABLE 2 # of ports (P) vs. upper limit of hash values (M) (N = 1)

| N = 1 | $1 \leq n \leq 2^N$ (n is an odd integer) | $0 \leq k \leq$ floor($N-\log_2 n$) | k | $P = 2^k * n$ (# of physical ports) | $M = 2^{k_{max}} * n$ (upper limit of hash values) |
|---|---|---|---|---|---|
| | 1 | $0 \leq k \leq 1$ | 0 | 1 | 2 |
| | | | 1 | 2 | 2 |

TABLE 3 # of ports (P) vs. upper limit of hash values (M) (N = 2)

| N = 2 | $1 \leq n \leq 2^N$ (n is an odd integer) | $0 \leq k \leq$ floor($N-\log_2 n$) | k | $P = 2^k * n$ (# of physical ports) | $M = 2^{k_{max}} * n$ (upper limit of hash values) |
|---|---|---|---|---|---|
| | 1 | $0 \leq k \leq 2$ | 0 | 1 | 4 |
| | | | 1 | 2 | 4 |
| | | | 2 | 4 | 4 |
| | 3 | k = 0 | 0 | 3 | 3 |

TABLE 4 # of ports (P) vs. upper limit of hash values (M) (N = 3)

| N = 3 | $1 \leq n \leq 2^N$ (n is an odd integer) | $0 \leq k \leq$ floor($N-\log_2 n$) | k | $P = 2^k * n$ (# of physical ports) | $M = 2^{k_{max}} * n$ (upper limit of hash values) |
|---|---|---|---|---|---|
| | 1 | $0 \leq k \leq 3$ | 0 | 1 | 8 |
| | | | 1 | 2 | 8 |
| | | | 2 | 4 | 8 |
| | | | 3 | 8 | 8 |
| | 3 | $0 \leq k \leq 1$ | 0 | 3 | 6 |
| | | | 1 | 6 | 6 |
| | 5 | k = 0 | 0 | 5 | 5 |
| | 7 | k = 0 | 0 | 7 | 7 |

TABLE 5 # of ports (P) vs. upper limit of hash values (M) (N = 4)

| N = 4 | $1 \leq n \leq 2^N$ (n is an odd integer) | $0 \leq k \leq$ floor($N-\log_2 n$) | k | $P = 2^k * n$ (# of physical ports) | $M = 2^{k_{max}} * n$ (upper limit of hash values) |
|---|---|---|---|---|---|
| | 1 | $0 \leq k \leq 4$ | 0 | 1 | 16 |
| | | | 1 | 2 | 16 |
| | | | 2 | 4 | 16 |
| | | | 3 | 8 | 16 |
| | | | 4 | 16 | 16 |
| | 3 | $0 \leq k \leq 2$ | 0 | 3 | 12 |
| | | | 1 | 6 | 12 |
| | | | 2 | 12 | 12 |
| | 5 | $0 \leq k \leq 1$ | 0 | 5 | 10 |
| | | | 1 | 10 | 10 |
| | 7 | $0 \leq k \leq 1$ | 0 | 7 | 14 |
| | | | 1 | 14 | 14 |
| | 9 | k = 0 | 0 | 9 | 9 |
| | 11 | k = 0 | 0 | 11 | 11 |
| | 13 | k = 0 | 0 | 13 | 13 |
| | 15 | k = 0 | 0 | 15 | 15 |

TABLE 6 # of ports (P) vs. upper limit of hash values (M) (N = 5)

| N = 5 | $1 \leq n \leq 2^N$ (n is an odd integer) | $0 \leq k \leq$ floor (N − $\log_2 n$) | k | $P = 2^k * n$ (# of physical ports) | $M = 2^k_{max} * n$ (upper limit of hash values) |
|---|---|---|---|---|---|
| | 1 | $0 \leq k \leq 5$ | 0 | 1 | 32 |
| | | | 1 | 2 | 32 |
| | | | 2 | 4 | 32 |
| | | | 3 | 8 | 32 |
| | | | 4 | 16 | 32 |
| | | | 5 | 32 | 32 |
| | 3 | $0 \leq k \leq 3$ | 0 | 3 | 24 |
| | | | 1 | 6 | 24 |
| | | | 2 | 12 | 24 |
| | | | 3 | 24 | 24 |
| | 5 | $0 \leq k \leq 2$ | 0 | 5 | 20 |
| | | | 1 | 10 | 20 |
| | | | 2 | 20 | 20 |
| | 7 | $0 \leq k \leq 2$ | 0 | 7 | 28 |
| | | | 1 | 14 | 28 |
| | | | 2 | 28 | 28 |
| | 9 | $0 \leq k \leq 1$ | 0 | 9 | 18 |
| | | | 1 | 18 | 18 |
| | 11 | $0 \leq k \leq 1$ | 0 | 11 | 22 |
| | | | 1 | 22 | 22 |
| | 13 | $0 \leq k \leq 1$ | 0 | 13 | 26 |
| | | | 1 | 26 | 26 |
| | 15 | $0 \leq k \leq 1$ | 0 | 15 | 30 |
| | | | 1 | 30 | 30 |
| | 17 | k = 0 | 0 | 17 | 17 |
| | 19 | k = 0 | 0 | 19 | 19 |
| | 21 | k = 0 | 0 | 21 | 21 |
| | 23 | k = 0 | 0 | 23 | 23 |
| | 25 | k = 0 | 0 | 25 | 25 |
| | 27 | k = 0 | 0 | 27 | 27 |
| | 29 | k = 0 | 0 | 29 | 29 |
| | 31 | k = 0 | 0 | 31 | 31 |

To balance the traffic flows among physical ports bundled within a port channel of a network switch, a hash algorithm may be applied to compute and assign hash values to each traffic flow using traffic parameters (e.g., source IP, destination IP, etc.) as input to the hash function. Each physical port within a port channel may also be pre-assigned one or more hash values so that the incoming traffic will be directed to a corresponding physical port whose hash value is matched with the traffic flow's hash value.

In the network, it is preferred to have the traffic evenly load-balanced among all the ports in a port channel. Embodiments may assign the hash values among ports in a port channel to achieve even traffic load-balancing among all the ports with the minimum traffic loss on exiting ports when adding or deleting a physical port in a port channel.

Embodiments to achieve even load-balanced hash value distribution may include a method to select certain hash values from 0 to $2^N-1$ and assign them to each port in a port channel to achieve even load balance among all the ports in a port channel. Based on the result of formula stages (1)-(8), the port number vs. upper limit of hash values mapping table may be created. The hash values within upper limit of hash values of M may be divided evenly among all the P ports. If all 0 to M−1 values are evenly assigned among P ports, all the traffic flows may be evenly load-balanced among P ports, assuming there exist hashing functions which can generate hash outputs between 0 to M−1 when applied to the traffic flows among P ports.

The method may take hash values from 0 to M−1 as active hashes and assign them evenly among P ports. Embodiments may take the hash values from M to $(2^N-1)$ as standby hashes and do best effort distribution among P ports. In some embodiments, the standby hash distribution can be ignored. But for the sake of completeness, the standby hashes may be considered in case the hashing functions on traffic flows would calculate all the possible hashes within $2^N$.

When adding or deleting a physical port in a port channel, the port number may be changed which can cause the upper limit of hash values to change. Embodiments may evenly assign the hash values based on the updated port number and upper limit of hash values among all the ports in a port channel so that each port gets fair share of the total hash values all the time, thus load-balancing traffic all the time.

Furthermore, when adding or deleting a physical port in a port channel, embodiments may make sure that the affected hash values on existing ports are minimum so that traffic loss on those ports is minimum.

Figure 2:
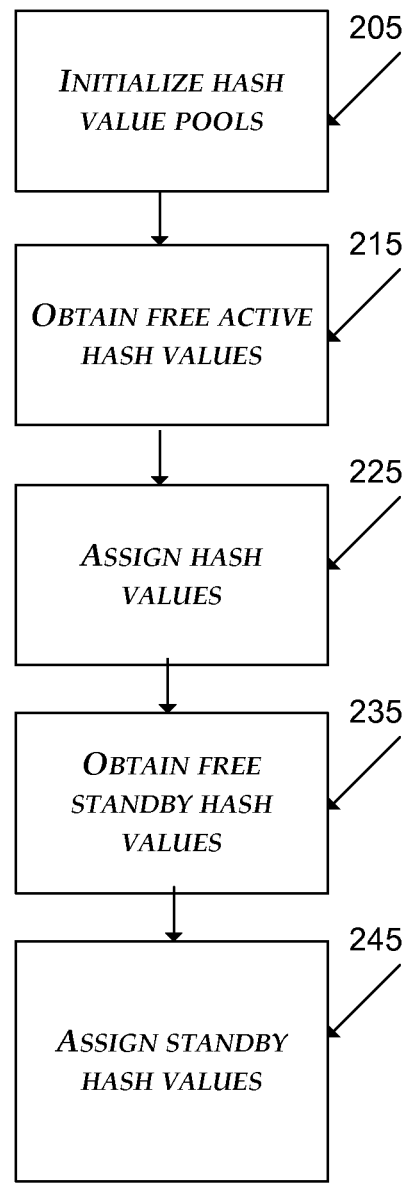
FIG. 2 is a flow chart of a method for providing embodiments of load-balancing hash value distribution.

FIG. 2 is a flow chart illustrating embodiments of achieving even load-balanced hash value distribution. There may be two input parameters to the embodiments. The first input parameter may be the number of ports in a port channel including to-be-added or to-be-deleted ports. The second input parameter may be the hash values for each member port including to-be-added or to-be-deleted ports. For the to-be-added ports, the input hash value is 0; for the to-be-deleted ports, the input hash values are the ones existing prior to port deletion.

The terms and variables used in the foregoing decription may include:
  Number of physical ports in a port channel: P
  Upper limit of hash values for P ports in a port channel: M
  Hash value range: from 0 to $2^N-1$
  current active hash per port: The current hash values on each port that is within the upper limit of hash values of M, e.g. 0 to M−1.
  current standby hash per port: The current standby hash values on each port that is outside of the upper limit of hash values of M, e.g. M to $2^N-1$.
  cur_active_hash_cnt_per_port (denoted as C): The count of hash values for the current active hash per port.
  target_active_hash_cnt_per_port (denoted as 7): The target count of active hash values derived based on the upper limit of hash values M and the updated number of ports in a port channel.
  cur_standby_hash_cnt_per_port (denoted as D): The count of standby hash values derived based on the current standby hash per port.
  free active hash values: Hash values that are in the upper limit of hash values of M and are collected from to-be-deleted port (for port deletion case only) and other existing ports in a port channel.
  free standby hash values: Hash values that are out of the upper limit of hash values of M and are collected from to-be-deleted port (for port deletion case only) and other existing ports in a port channel.
  global free active hash value pool: the pool that stores all the free active hash values.
  global free standby hash value pool: the pool that stores all the free standby hash values.

Method 200 may initialize at step 205 where the global free active hash value pool and global free standby hash value pool may be initialized. When adding or deleting a port in a port channel, the number of ports in the port channel may be updated. Given the updated number of ports (P) in a port channel, based on the # of ports (P) vs. upper limit of hash values (M) mapping table, the upper limit of hash values (M) may be determined as described above.

If a port needs to be deleted from a port channel, step 205 may further comprise obtaining the hash values associated with the deleted port and assign each of them to either the global free active hash value pool or the global free standby hash value pool based on M. Similarly, if a first port needs to be added to a port channel, step 205 may further comprise initializing the global free active hash value pool with all the hash values starting from 0 to $2^N-1$ and initializing the global free standby hash value pool to be empty.

Method 200 may then proceed to step 215, where free active hash values may be obtained from existing ports and added to the global free active hash value pool. In step 215, target active hash per port may be determined and target_active_hash_cnt_per_port, denoted as T may be obtained. Furthermore, step 215 may comprise determining the current active hash per port for each existing port and obtaining each existing port's cur_active_hash_cnt_per_port, denoted as C. If (C>T), then among the new active hash values associated with this port, randomly selecting (C−T) hash values and adding them to the global free active hash value pool.

Next, method 200 may proceed to step 225. At step 225, free active hash values may be assigned from the global free active hash value pool to ports which have less number of active hash values than the target T. For each existing port, a determination may be made as to whether (C<T). If C<T, embodiments may randomly select (T−C) active hash values from the global free active hash value pool and assign them to the port.

Method 200 may then proceed to step 235 where free standby hash values may again be obtained from existing ports and added to global free standby hash value pool. For each existing port, the current standby hash per port may be determined and the port's cur_standby_hash_cnt_per_port may be obtained, denoted as D. Subsequently, if (D>1), (D−1) standby hash values may be randomly selected and moved into the global free standby hash value pool.

Finally, method 200 may proceed to step 245. At step 245, free standby hash values may be assigned from the global free standby hash value pool to ports which have less number of standby hash values than target T. For each existing port, if (D=0) and the global free standby hash value pool is not empty, a free standby hash value may be randomly selected from the global free standby hash value pool and assigned to the port.

In some embodiments, a platform may support a port channel with 8 physical ports. In this example, since $2^N=8$, then N=3. The mapping table of # of ports (P) vs. upper limit of hash values (M) for N=3 is illustrated above in Table 4. Subsequently, method 200 may be applied implementing Table 4 when adding or deleting a port in a port channel. Two cases are illustrated below in FIGS. 3 and 4 to show how method 200 works when ports are added and deleted in a port channel.

Figure 3:
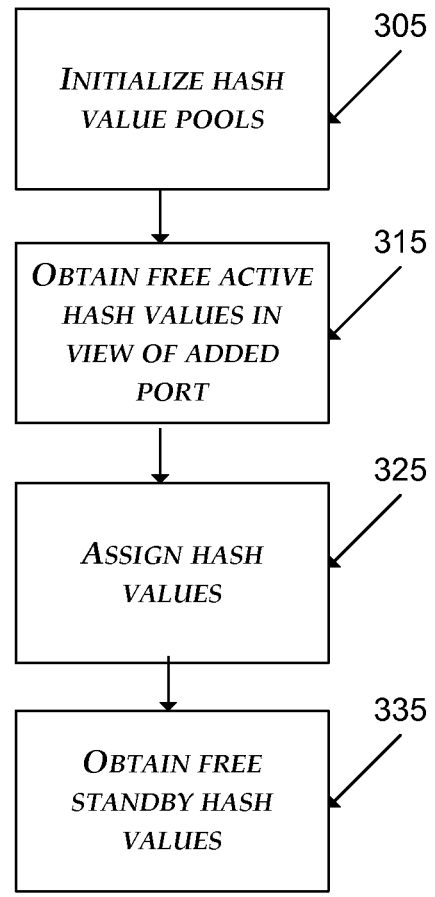
FIG. 3 is a flow chart of a method for providing embodiments of load-balancing hash value distribution.

FIG. 3 is a flow chart illustrating embodiments of achieving even load-balanced hash value distribution. A port channel may have 2 member ports of port1 and port2. A third member port port3 may be added to the port channel. According to Table 4, the upper limit of hash values of M will be 6 in this case. Assume the current hash distribution in port ASIC for port1 and port2 are as below:

| port1 | port2 |
|---|---|
| 0 | 2 |
| 1 | 4 |
| 3 | 5 |
| 6 | 7 |

Method 300 may begin at step 305 where the global free active hash value pool and global free standby hash value pool may be initialized. When adding a port in a port channel with 2 ports, the updated number of ports (P) in the port channel is 3. Referring to mapping Table 4, for P=3, M=6.

Method 300 may then proceed to step 315 and obtain free active hash values from existing ports and add them to the global free active hash value pool. The value of target_active_hash_cnt_per_port (7) may equal 2 since M=6 and P=3. For port1, the current active hash value per port based on M=6 is illustrated below in parenthesis. cur_active_hash_cnt_per_port (C) then equals 3.

port1
(0)
(1)
(3)
6

Since C>T, among the new active hash values associated with port1 (e.g, 0, 1 and 3), a randomly selected (C−T=1) hash value of 0 is obtained and the hash values may be added to the global free active hash value pool.

Similarly, for port2, the current active hash value per port based on M=6 shown below in parenthesis may be determined. cur_active_hash_cnt_per_port (C) again equals 3.

port2
(2)
(4)
(5)
7

Since (C>T), among the new active hash values associated with port2 (e.g, 2, 4, and 5), a randomly selected (C−T=1) hash value of 4 may be generated and moved to the global free active hash value pool.

Since port3 is a new port, there is no hash value on it yet, thus cur_active_hash_cnt_per_port (C) is 0. There may be no free active hash values on this port.

After step 315, the port hash distribution should now look like:

| port1 | port2 | port3 |
|---|---|---|
| 1 | 2 | |
| 3 | 5 | |
| 6 | 7 | |

Method 300 may then proceed to step 325 where free active hash values may be assigned from the global free active hash value pool to ports which have a lesser number of active hash values than the target. Among port1, port2 and port3, only port3 meets C<T condition. Next, randomly select (T−C=2) free active hash values (e.g. 0 and 4) from the global free active hash value pool and assign them to port3 shown below in parenthesis.

After step 325, the port hash distribution should look like:

| port1 | port2 | port3 |
|---|---|---|
| 1 | 2 | (0) |
| 3 | 5 | (4) |
| 6 | 7 | |

Method 300 may then proceed to step 335 where free standby hash values may be obtained from existing ports and placed in the global free standby hash value pool. Both port1 and port2 have cur_standby_hash_cnt_per_port (D) equal to 1 and their current standby hash value per port is marked in brackets in the distribution below.

| port1 | port2 | port3 |
|-------|-------|-------|
| 1     | 2     | 0     |
| 3     | 5     | 4     |
| [6]   | [7]   |       |

After step 335, there are no more free standby hash values spared for the global free standby hash value pool. port1 and port2 will keep their standby hash values as is.

After step 335, the port hash distribution table should look like:

| port1 | port2 | port3 |
|-------|-------|-------|
| 1     | 2     | 0     |
| 3     | 5     | 4     |
| 6     | 7     |       |

Figure 4:
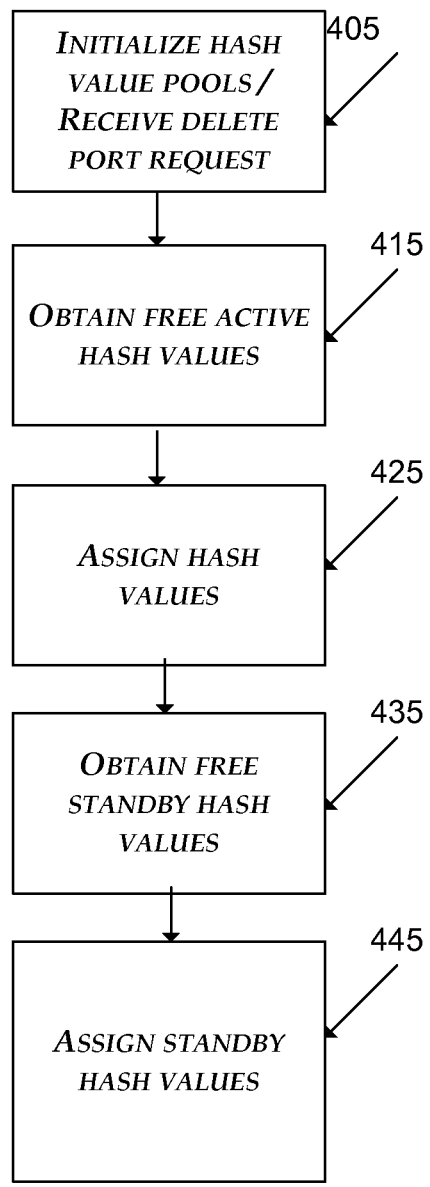
FIG. 4 is a flow chart of a method for providing embodiments of load-balancing hash value distribution.

FIG. 4 is a flow chart illustrating embodiments of achieving even load-balanced hash value distribution. Here, the port channel may have 4 member ports of port1, port2, port3 and port4. A request is received to delete port4 in the port channel. According to Table 4, the upper limit of hash values of M changes from 8 for 4 ports to 6 for 3 ports upon deletion of port4.

For method 400, assume the current hash distribution on port1, port2 and port3 is as below and letter 'x' marks the port to be deleted.

| port1 | port2 | port3 | (x) port4 |
|-------|-------|-------|-----------|
| 1     | 2     | 0     | 3         |
| 6     | 5     | 4     | 7         |

Method 400 may commence at step 405 where the global free active hash value pool and global free standby hash value pool may be initialized. After deleting a port in a port channel with 4 ports, the updated number of ports (P) in the port channel is 3. Referring to Table 4, for P=3, M=6. A request may be received to delete port4 from the port channel. The hash values associated with deleted port4 may be obtained: (3 and 7). Hash (value 3) may be assigned to the global free active hash value pool and hash (value 7) may be assigned to the global free standby hash value pool.

Method 400 may then proceed to step 415. At step 415, free active hash values may be obtained from existing ports and added to the global free active hash value pool. target_active_hash_cnt_per_port (T) of 2 may be determined as M=6 and P=3. For port1, the current active hash per port for port1 is shown below in parenthesis. The obtained cur_active_hash_cnt_per_port (C) is 1.

port1
(1)
6

As C<T, there are no more free active hash values from port1.

For port2, the current active hash per port is shown below in parenthesis. The obtained cur_active_hash_cnt_per_port (C) is 2.

port2
(2)
(5)

Since C=T, there are no more free active hash values from port2.

For port3, the current active hash per port is shown below in parenthesis. The obtained cur_active_hash_cnt_per_port (C) is 2.

port3
(0)
(4)

Since C=T, there are no more free active hash values from port3. After step 415, the global free active hash values pool has a value of 3 available.

Method 400 may then proceed to step 425 where free active hash values may be assigned from the global free active hash value pool to ports which have a lesser number of active hash values than target T. Since C=1 and T=2 for port1, only port1 meets the C<T condition. Next, randomly select (T−C=1) active hash (value 3) from the global free active hash value pool and assign it to port1 as shown below in parenthesis. After step 425, the port hash distribution should look like:

| port1 | port2 | port3 |
|-------|-------|-------|
| 1     | 2     | 0     |
| (3)   | 5     | 4     |
| 6     |       |       |

Method 400 may then proceed to step 435 where free standby hash values may be obtained from existing ports and placed in the global free standby hash value pool. The resultant standby hash value per port for port1, port2 and port3 are shown in brackets below in the port hash distribution table:

| port1 | port2 | port3 |
|-------|-------|-------|
| 1     | 2     | 0     |
| 3     | 5     | 4     |
| [6]   |       |       |

For port1, cur_standby_hash_cnt_per_port (D)=1. For port2 and port3, D=0. After step 435, the global free standby hash values pool has a value of 7.

Next, method 400 may proceed to step 445. At step 445, free standby hash values may be assigned from the global free standby hash value pool to ports which have a lesser number of standby hash values than the target T. Both port2 and port3 have D=0. Thus, port3 may be randomly chosen and assigned the standby free hash value of 7 as shown as below in brackets.

| port1 | port2 | port3 |
|-------|-------|-------|
| 1     | 2     | 0     |
| 3     | 5     | 4     |
| 6     |       | [7]   |

Now the global free standby hash values pool is empty. The final port hash distribution should look like below:

| port1 | port2 | port3 |
|---|---|---|
| 1 | 2 | 0 |
| 3 | 5 | 4 |
| 6 |   | 7 |

Embodiments described herein achieve even traffic load-balancing among physical ports in a port channel with $2^N$ ports of a networking switch. Embodiments may derive an upper limit of hash values given all the possible number of ports within a port channel. Based on the determined upper limit of hash values, embodiments provide the steps to evenly distribute hash values among ports in a port channel when adding or deleting a port to achieve even traffic load-balancing among ports in a port channel all the time.

Embodiments may be implemented in a network device, such as a network switch where each port channel can have up to $2^N=8$ (where N=3) physical ports bundled together. The advantage of described embodiments includes solving the hash distribution scalability issue when a port channel has up to $2^N$ ports in it where N is an integer and N>3 while achieving the even traffic load-balancing among all the ports in a port channel. For example, the port channel can scale from the current 8 ports per port channel up to 16 or 32 ports per port channel while achieving even traffic load-balancing among ports in a port channel on a network switch. The methods can also be applied to other network devices which support port channels with up to $2^N$ ports per port channel and support even traffic load-balancing among all the ports in a port channel.

Generally, consistent with even traffic load balancing according to embodiments of this invention, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of even traffic load balancing may also be practiced in distributed network environments where tasks are performed by remote processing devices that are linked through a communications network. In a distributed network environment, program modules may be located in both local and remote memory storage devices.

Furthermore, embodiments of even traffic load balancing may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of even traffic load balancing, for example, may be implemented as a computer process (method), a network system, or as an article of manufacture, such as a computer program product or computer readable media. The computer program product may be a computer storage media readable by a computer system and encoding a computer program of instructions for executing a computer process. The computer program product may also be a propagated signal on a carrier readable by a network system and encoding a computer program of instructions for executing a computer process. Accordingly, aspects of even traffic load balancing may be embodied in hardware and/or in software (including firmware, resident software, micro-code, etc.). In other words, embodiments of even traffic load balancing may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of even traffic load balancing, for example, are described above with reference to block diagrams and/or operational illustrations of methods, systems, and computer program products according to embodiments of even traffic load balancing. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of even traffic load balancing have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of even traffic load balancing.

At least the following is claimed:

1. A method for hash distribution comprising:
   initializing a global free active hash value pool and a global free standby hash value pool;
   determining available free active hash values from a plurality of ports currently associated with the port channel;

adding available free active hash values to the global free active hash value pool;

comparing a target active hash count per port with a current active hash count per port for each of the plurality of ports associated with the port channel;

if the current active hash count per port for one of the plurality of ports is greater than the target active hash count per port, randomly selecting a number of hash values equal to the difference of the current active hash count per port for one of the plurality of ports and the target active hash count per port, and releasing the randomly selected hash values to the global free active hash value pool; and if the current active hash count per port for one of the plurality of ports is less than the target active hash count per port, randomly selecting a number of hash values from the global free active hash pool equal to the difference of the current active hash count per port for the same one of the plurality of ports and the target active hash count per port, and assigning the randomly selected hash values to the same one of the plurality of ports.

2. The method of claim 1, further comprising creating a mapping table comprising a maximum hash value for each available number of ports.

3. The method of claim 2, further comprising computing the target active hash count per port based on the mapping table.

4. The method of claim 1, further comprising adding a first port to the port channel.

5. The method of claim 4, further comprising randomly selecting a number of hash values from the global free active hash pool equal to the target active hash count per port, and assigning the randomly selected hash values to the first port.

6. The method of claim 1, further comprising determining available standby hash values from the plurality of ports currently associated with the port channel.

7. The method of claim 6, further comprising adding the determined available standby hash values to the global free standby hash pool.

8. A method comprising:
A method for hash distribution comprising:
initializing a global free active hash value pool and a global free standby hash value pool;
receiving a request to delete a port in a port channel;
determining one or more hash values associated with the port to be deleted;
assigning one or more determined hash values to the global free active hash value pool;
assigning one or more determined hash values to the global free standby hash value pool;
determining available free active hash values from a plurality of ports currently associated with the port channel after deletion of the port to be deleted;
comparing a target active hash count per port with a current active hash count per port for each of the plurality of ports associated with the port channel;
if the current active hash count per port for one of the plurality of ports is greater than the target active hash count per port, randomly selecting a number of hash values equal to the difference of the current active hash count per port for one of the plurality of ports and the target active hash count per port, and releasing the randomly selected hash values to the global free active hash value pool; and if the current active hash count per port for one of the plurality of ports is less than the target active hash count per port, randomly selecting a number of hash values from the global free active hash pool equal to the difference of the current active hash count per port for the same one of the plurality of ports and the target active hash count per port, and assigning the randomly selected hash values to the same one of the plurality of ports.

9. The method of claim 8, further comprising adding a plurality of ports to the port channel.

10. The method of claim 9, further comprising randomly selecting a number of hash values from the global free active hash pool equal to the target active hash count per port, and assigning the randomly selected hash values to the first port.

11. The method of claim 8, further comprising determining available standby hash values from the plurality of ports currently associated with the port channel.

12. The method of claim 8, further comprising creating a mapping table comprising a maximum hash value for each available number of ports.

13. The method of claim 12, further comprising computing the target active hash count per port based on the mapping table.

14. The method of claim 12, wherein the port channel comprises $2^N$ ports where N is greater than 3.

15. A network device comprising:
a port channel;
one or more ports associated with the port channel;
a memory comprising a global free active hash pool;
a processor configured to execute instructions comprising:
comparing a target active hash count per port with a current active hash count per port for each of the one or more ports associated with the port channel;
if the current active hash count per port for the one or more ports is greater than the target active hash count per port, randomly selecting a number of hash values equal to the difference of the current active hash count per port for the one or more ports and the target active hash count per port, and releasing the randomly selected hash values to the global free active hash value pool; and
if the current active hash count per port for the one or more ports is less than the target active hash count per port, randomly selecting a number of hash values from the global free active hash pool equal to the difference of the current active hash count per port for the same one or more ports and the target active hash count per port, and assigning the randomly selected hash values to the same one or more ports.

16. The system of claim 15, wherein the network device is a network switch.

17. The system of claim 15, wherein the memory further comprises a mapping table comprising a maximum hash value for each available number of ports.

18. The system of claim 15, further comprising a first port added to the one or more ports associated with the port channel.

19. The system of claim 18, the processor further configured to:
randomly select a number of hash values from the global free active hash pool equal to the target active hash count per port, and assign the randomly selected hash values to the first port.

20. The system of claim 15, wherein the memory further comprises a global free standby hash value pool.

* * * * *